United States Patent
Qi

(10) Patent No.: US 7,596,684 B2
(45) Date of Patent: Sep. 29, 2009

(54) SYSTEM AND METHOD FOR CHECKING VALIDITIES OF INSTALLING HARD DISKS IN A COMPUTER

(75) Inventor: Guo-Chao Qi, Guangdong (CN)

(73) Assignees: Hong Fu Jin Precision Industry (Shen Zhen) Co., Ltd., Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 482 days.

(21) Appl. No.: 11/309,806

(22) Filed: Sep. 29, 2006

(65) Prior Publication Data

US 2007/0260864 A1 Nov. 8, 2007

(30) Foreign Application Priority Data

Nov. 4, 2005 (CN) .................... 2005 1 0101033

(51) Int. Cl.
G06F 15/177 (2006.01)
G06F 11/00 (2006.01)
(52) U.S. Cl. .................... 713/1; 713/2; 714/36
(58) Field of Classification Search ............ 713/1, 713/2
See application file for complete search history.

(56) References Cited

U.S. PATENT DOCUMENTS

| | | | | |
|---|---|---|---|---|
| 6,000,023 A * | 12/1999 | Jeon | ............ | 711/173 |
| 6,058,372 A * | 5/2000 | Sweet et al. | ............ | 705/16 |
| 6,154,836 A * | 11/2000 | Dawson et al. | ............ | 713/1 |
| 6,438,685 B1 * | 8/2002 | Brower et al. | ............ | 713/1 |
| 6,453,469 B1 * | 9/2002 | Jystad | ............ | 717/174 |
| 7,111,202 B2 * | 9/2006 | Cagle et al. | ............ | 714/36 |
| 7,206,976 B2 * | 4/2007 | Wookey et al. | ............ | 714/47 |
| 2003/0126504 A1 | 7/2003 | Ryan et al. | | |

OTHER PUBLICATIONS

How It Works: Master Boot Record (MBR), May 6, 2002, www.ata-atapi.com/hiwmbr.html, pp. 1-5.*
Partition is deleted or Partition Table is damaged, www.ntfs.com/partition-deleted.html, NTFS.com, pp. 1-3.*

* cited by examiner

Primary Examiner—Suresh K Suryawanshi
(74) Attorney, Agent, or Firm—Winston Hsu

(57) ABSTRACT

A system for checking validities of installing hard disks in a computer is provided. The system includes: a calling module (10) for calling BIOS interrupt named INT13; a setting module (11) for setting parameters for the INT13; an executing module (12) for clearing partition tables of OS-less hard disks under DOS; and for reading a partition table of a hard disk installed in a specified interface under Windows; and a detecting module (15) for detecting whether the partition table of the hard disk is null, and for returning a success message if the partition table is not null. A related method is also disclosed.

6 Claims, 4 Drawing Sheets

SYSTEM AND METHOD FOR CHECKING VALIDITIES OF INSTALLING HARD DISKS IN A COMPUTER

FIELD OF THE INVENTION

The present invention generally relates to the field of checking a computer system configuration, and more particularly relates to a system and method for checking validities of installing hard disks in a computer.

DESCRIPTION OF RELATED ART

All types of computer systems have increased greatly in complexity in recent years. One result of this increase in complexity is the tailoring of hardware, software, and firmware configurations of computers to particular end users.

When a user orders a computer, a particular system configuration is specified. Such configuration comprises a hardware configuration, firmware in which reside many of the basic routines required to make the hardware run, and a software configuration or a software package that includes all the software. The user specifies a particular OS (operating system) the user wishes to use, any optional modules of the OS to give particular types of enhanced functionality and usually a number of application programs that run within the OS.

During computer assembly there may occur installation errors in the configurations. For example, customers specify that a hard disk with OS should be installed in a specified IDE (integrated drive electronics) interface or SATA (serial advanced technology attachment) interface. Generally, appearances of hard disks with OS or hard disks without OS are same, which probably leads to installation errors of hard disks. However, at present, there are no tools available for checking whether hard disks have been correctly installed to fulfill a customer's requirements.

What is needed, therefore, is a system and method for checking validities of installing hard disks in a computer, that can automatically check installation validities of hard disks in the computer, so as to shorten checking time, and assure the OS preinstalled hard disk is installed correctly in a specified interface.

SUMMARY OF THE INVENTION

A system for checking validities of installing hard disks in a computer is disclosed. The system includes: a calling module for calling a BIOS interrupt named INT13; a setting module for setting parameters for the INT13; an executing module for clearing partition tables of OS-less hard disks under DOS; and for reading a partition table of a hard disk installed in a specified interface under Windows; and a detecting module for detecting whether the partition table of the hard disk is null, and for returning a success message if the partition table is not null. The specified interface is an interface specified by customers, which is used for installing an OS preinstalled hard disk.

Further, a preferred method for checking validities of installing hard disks in a computer is also disclosed. The method includes the steps of: calling a BIOS interrupt named INT13; setting parameters for the INT13; clearing partition tables of OS-less hard disks under DOS; resetting and running into Windows; reading a partition table of a hard disk installed in a specified interface; and detecting whether the partition table is null under Windows.

Other advantages and novel features of the embodiments will be drawn from the following detailed description with reference to the attached drawings, in which:

DETAILED DESCRIPTION OF THE INVENTION

In order to describe the preferred embodiments conveniently, it is specified that a SATA1 interface and a SATA2 interface are provided by a computer for coupling hard disks. Furthermore, it is specified that the SATA1 interface in the computer is the preferred interface to be used for installing an operation system (OS) preinstalled hard disk. However, manufacturers may unknowingly install the OS preinstalled hard disk at the SATA2 interface during the computer assembly. That is, there is an installation error when the OS preinstalled hard disk is installed at the SATA2 interface.

Figure 1:
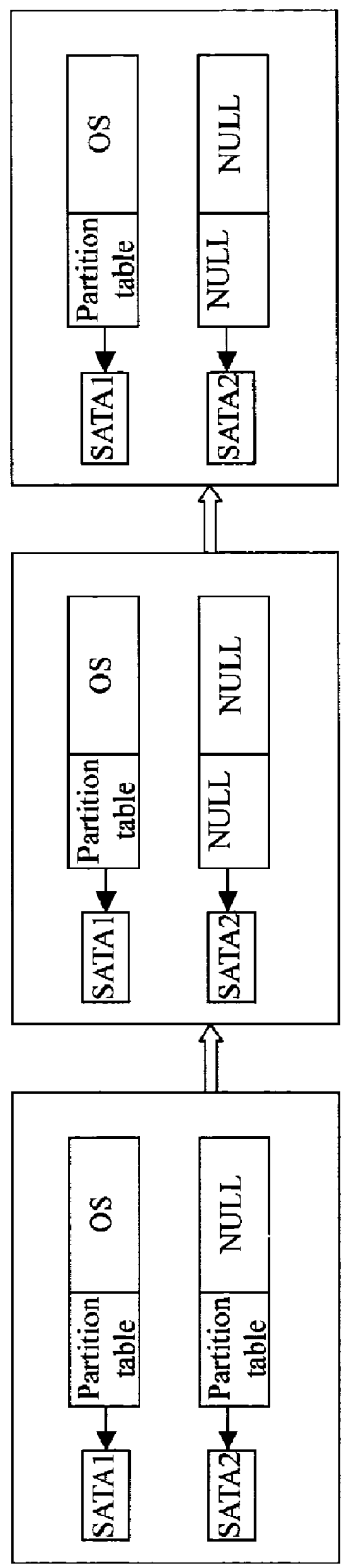
FIG. 1 and FIG. 2 are schematic diagrams for implementing a system for checking validities of installing hard disks.
Figure 2:
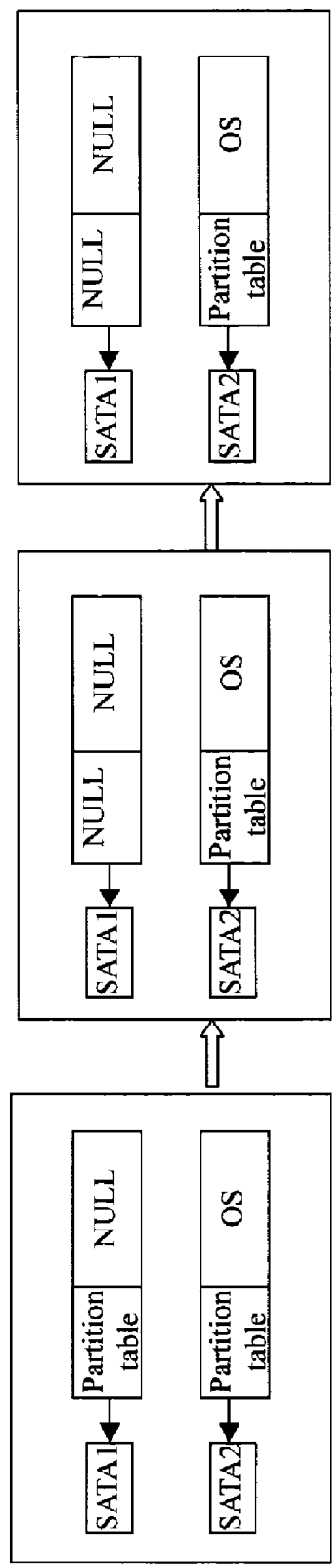

FIG. 1 and FIG. 2 are exemplary diagrams for implementing a system for checking vaildities of installing hard disks in a computer (hereinafter "the checking system 1", described in FIG. 3) in accordance with a preferred embodiment. It is understood that a motherboard of a computer supporting a SATA hard disk comprises a plurality of SATA interfaces, such as the SATA1 interface and the SATA2 interface.

FIG. 1 represents a situation of the OS preinstalled hard disk installed at the SATA1 interface correctly. And FIG. 2, represents another situation of the OS preinstalled hard disk being installed at the SATA2 interface incorrectly. In the preferred embodiment, there are three blocks in FIG. 1 and FIG. 2. In the first block, the SATA1 and the SATA2 interface is installed a hard disk. There is an OS preinstalled hard disk installed at the SATA1 interface or the SATA2 interface. In the second block, the checking system 1 clears a partition table of another OS-less hard disk under DOS (disk operating system). Generally, a computer identifies hard disks in logical location under DOS, therefore, the OS preinstalled hard disk is called a logical one hard disk under DOS. However, the computer identifies the hard disks in physical location under Windows. The hard disk installed in the SATA1 interface is called a physical one hard disk. In the third block, the checking system 1 detects if the partition table of the physical hard disk under windows is null. If the partition table is null, the checking system identifies that the OS preinstalled hard disk is installed incorrectly. If the partition table is not null, the checking system identifies that the OS preinstalled hard disk is installed correctly in the SATA1 interface.

Figure 3:
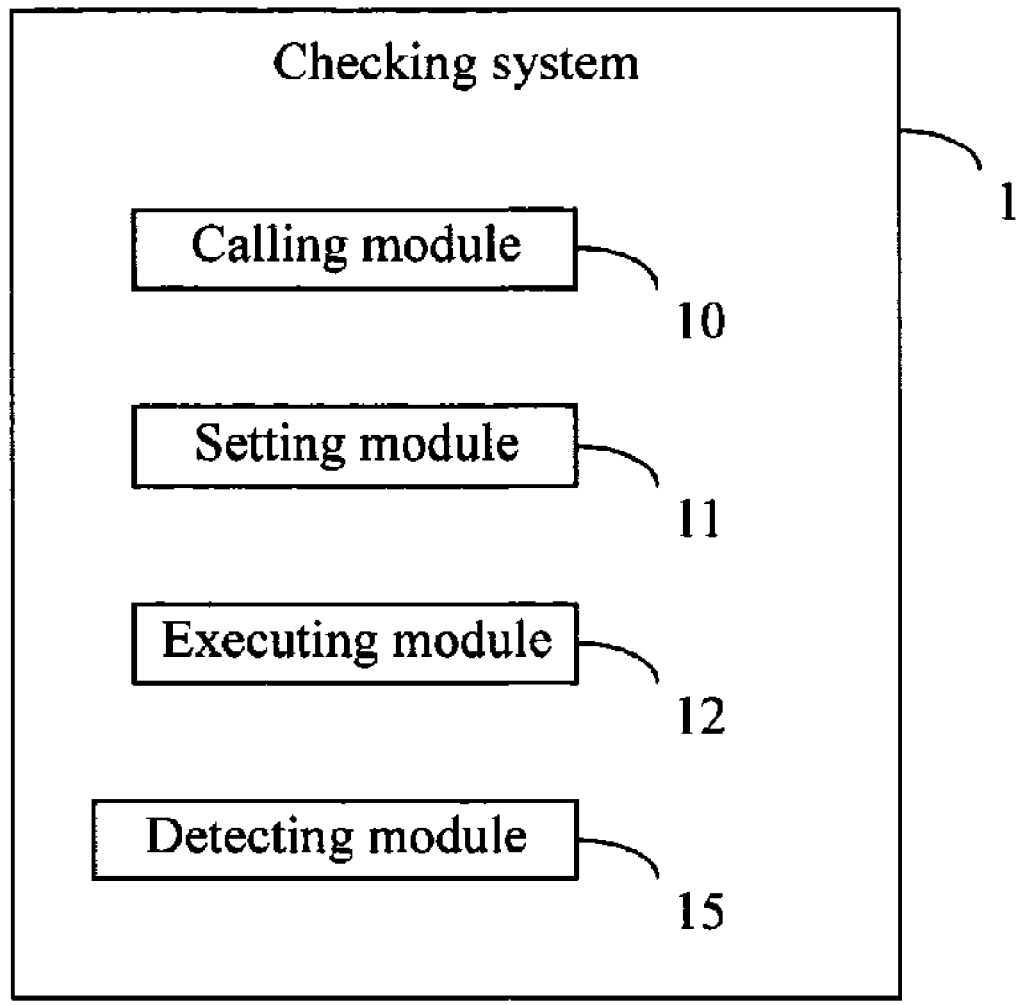
FIG. 3 is a schematic diagram of function modules of the checking system.

FIG. 3 is a schematic diagram of function modules of the checking system. The checking system 1 is used for detecting whether the OS preinstalled hard disk is installed correctly. The checking system 1 includes a calling module 10, a setting module 11, an executing module 12, and a detecting module 15.

The calling module 10 is used for calling a BIOS (basic input output system) interrupt named INT13 under DOS. The INT13 is an interrupt vector for a hard disk access command. The setting module 11 is used for setting parameters for the INT13 to operate/access an OS-less hard disk under DOS. The parameters include, for example, ah=03h// representing writing a hard disk; al=01h// representing writing a memory buffer register; dl=81h// representing clearing a partition table of an OS-less hard disk. Usually, 81h refers to the OS-less hard disk.

The executing module 12 is used for clearing partition tables of OS-less hard disks according to the parameters of the INT13 under DOS, and for reading the partition table of the physical one hard disk under Windows. That is, the executing module 12 clears partition tables of the OS-less hard disks.

The detecting module 15 is used for detecting whether the partition table of the physical one hard disk is null under Windows. If the partition table is null, the detecting module 15 returns an error message meaning that the OS preinstalled hard disk is installed incorrectly. If the partition table isn't null, the detecting module 15 returns a success message that means the OS preinstalled hard disk is installed correctly.

Figure 4:
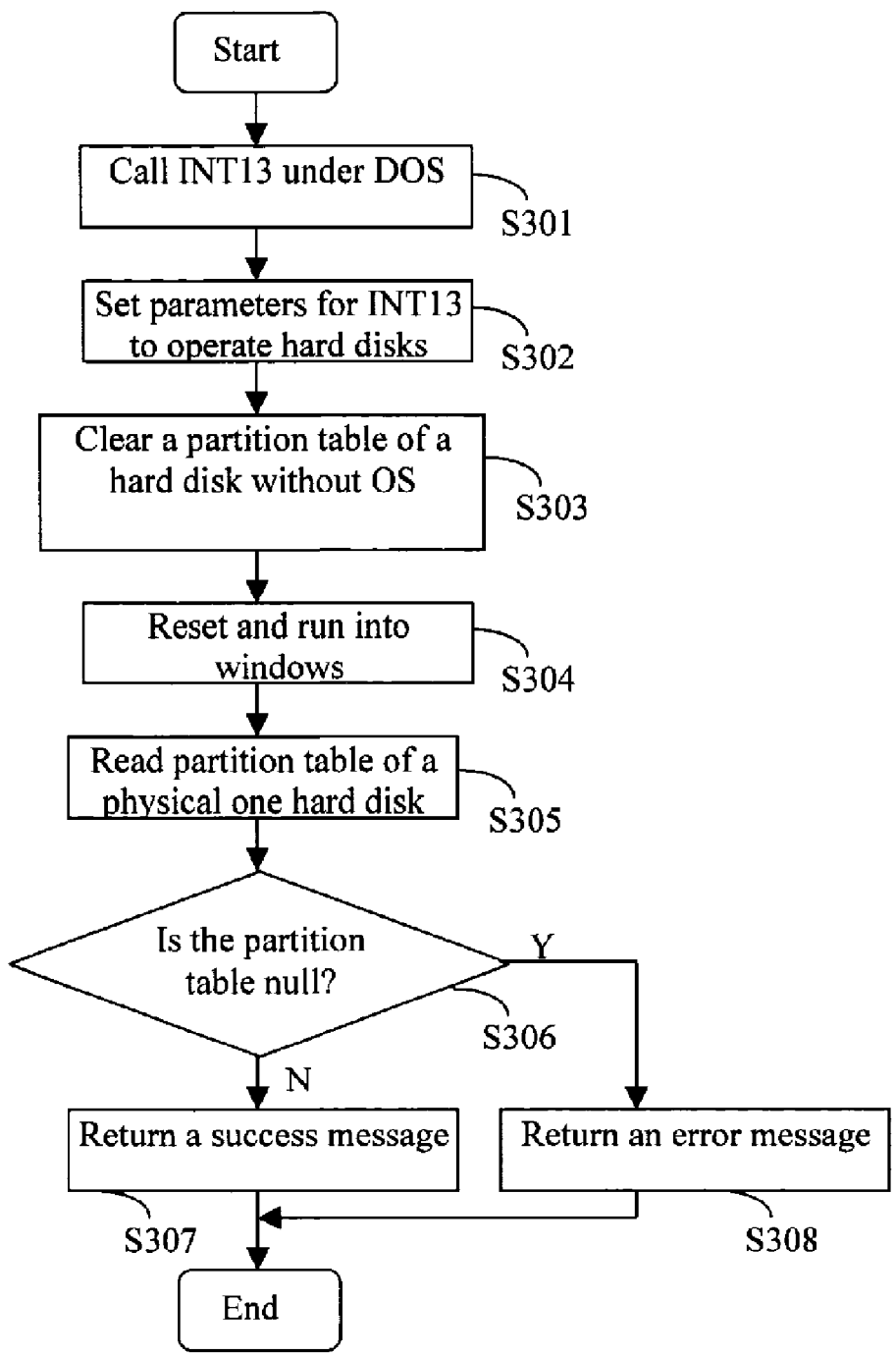
FIG. 4 is a flow chart of a preferred method for checking validities of installing hard disks by implementing the system of FIG. 2.

FIG. 4 is a flow chart of a preferred method for checking validities of hard disks in a computer by implementing the system as described above. In the preferred embodiments, it is specified that the SATA1 interface in the computer is used for installing the OS preinstalled hard disk. And the hard disk installed in the SATA1 interface is called the physical one hard disk. In step S301, when the computer is powered on, the calling module 10 calls the BIOS interrupt named INT13 under DOS. The INT13 is the interrupt vector for hard disk access command. In step S302, the setting module 11 sets parameters for the INT13 to operate/access the OS-less hard disk. The parameters include, for example, ah=03h// representing writing a hard disk; al=01h// representing writing a memory buffer register; dl=81h// representing clearing a partition table of the OS-less hard disk. Usually, 81h refers to the OS-less hard disk. In step S303, the executing module 12 clears the partition table of the OS-less hard disk according to the parameters under DOS. In step S304, the computer resets and runs Windows. In step S305, the executing module 12 reads a partition table of the physical one hard disk installed in the SATA1 interface.

In step S306, the detecting module 15 detects whether the partition table of the physical one hard disk is null. In step S307, the detecting module 15 returns a success message if the partition table of the physical one hard disk is not null. That is, the OS preinstalled hard disk is installed correctly in the SATA1 interface. Contrary, in step S308, the detecting module 15 returns an error message if the partition table of the physical one hard disk is null. That is, the OS preinstalled hard disk is installed incorrectly.

It should be emphasized that the above-described embodiments, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for checking validities of installing hard disks in a computer, comprising:
   a calling module for calling a BIOS (basic input output system) interrupt named INT13;
   a setting module for setting parameters for the INT13;
   an executing module for clearing partition tables of an OS-less hard disks under DOS according to the parameters, and for reading a partition table of a hard disk installed in a specified interface under an operating system; and
   a detecting module for detecting whether the partition table of the hard disk is null, and for returning a success message if the partition table is not null.

2. The system according to claim 1, wherein the specified interface is an interface specified by customers, which is used for installing an OS preinstalled hard disk.

3. The system according to claim 1, wherein the detecting module is further used for returning an error message if the partition table is null.

4. A method for checking validities of installing hard disks in a computer, the method comprising the steps of:
   calling a BIOS (basic input output system) interrupt named INT13;
   setting parameters for the INT13;
   clearing partition tables of an OS-less hard disks under DOS;
   resetting and running into an operating system;
   reading a partition table of a hard disk installed in a specified interface;
   detecting whether the partition table of the hard disk is null; and
   returning a success message if the partition table is not null.

5. The method according to claim 4, wherein the detecting step further comprises the step of:
   returning an error message if the partition table is null.

6. The method according to claim 4, wherein the specified interface is an interface specified by customers, which is used for installing an OS preinstalled hard disk.

* * * * *